United States Patent Office 2,798,101
Patented July 2, 1957

2,798,101

1-HYDROXY-3-METHYL-5-(1-HYDROXY-2,6,6-TRI-METHYL-CYCLOHEXYL)-2-PENTENE-4-YNE

Hans Herloff Inhoffen, Braunschweig, Germany, assignor to Hoffmann-La Roche Inc., Nutley, N. J., a corporation of New Jersey No Drawing. Application December 7, 1954,
Serial No. 473,727

Claims priority, application Switzerland
December 24, 1953

1 Claim. (Cl. 260—631)

The present invention concerns a novel acetylene-carbinol compound, i. e. 1-hydroxy-3-methyl-5-[1-hydroxy-2,6,6-trimethylcyclohexyl]-2-pentene-4-yne and a process for the manufacture thereof.

The process provided by the invention for the obtention of the above compound comprises reacting 2,6,6-trimethylcyclohexanone with an organo-metal compound, preferably an organo-lithium compound or a Grignard compound, of 1-hydroxy-3-methyl-2-pentene-4-yne and hydrolysing the condensation product formed.

The organo-metal compound of 1-hydroxy-3-methyl-2-pentene-4-yne may be formed prior to the condensation by reacting the same in a manner known per se, in an inert solvent such as ether, with 2 mols of a lithium compound, such as butyl-lithium, or with 2 mols of an alkyl magnesium halide, such as methyl magnesium iodide. The lithium or Grignard compound of 1-hydroxy-3-methyl-2-pentene-4-yne formed is then reacted in a solvent, such as ethyl ether, preferably while stirring, with the equivalent amount of trimethylcyclohexanone. It is advisable to add the 2,6,6-trimethylcyclohexanone while cooling, to the solution of the lithium or Grignard compound. In order to complete the reaction, it may be indicated to reflux the reaction solution. The condensation product formed is then hydrolysed. This may be achieved by treatment with an aqueous solution of an ammonium salt, such as ammonium chloride, or by the action of dilute aqueous acids, the reaction mixture being preferably cooled with ice.

A suitable mode of procedure comprises reacting trimethylcyclohexanone in ethyl ether with the dimagnesium iodide compound of 1-hydroxy-3-methyl-2-pentene-4-yne and hydrolysing the condensation product formed by treatment with an ammonium salt solution and with a dilute acid.

The 1-hydroxy-3-methyl-5-(1-hydroxy-2,6,6-trimethylcyclohexyl)-2-pentene-4-yne obtained has an absorption maximum in the ultraviolet spectrum at 228 m$\mu$. 1-hydroxy-3-methyl-2-pentene-4-yne having not reacted may easily be removed by distillation in high vacuo. The separation of trimethylcyclohexanone in excess may also be easily achieved, for example by extraction of the acetylenecarbinol compound from a petroleum ether solution by means of 75% methanol. The 1-hydroxy-3-methyl - 5 - (1-hydroxy - 2,6,6 - trimethylcyclohexyl)-2-pentene-4-yne may be separated into two stereomeric forms by fractionated crystallisation in petroleum ether. The stereomeric form which is more difficultly soluble in petroleum ether melts at 75.5–76.5° (ultraviolet maximum 228 m$\mu$, $\epsilon=14{,}000$), whereas the stereomeric form more easily soluble in petroleum ether melts at 88–89° (ultraviolet max. 228 m$\mu$, $\epsilon=13{,}300$).

1-hydroxy-3-methyl-5-(1-hydroxy-2,6,6-trimethylcyclohexyl)-2-pentene-4-yne represents an important intermediate in the synthesis of vitamin A and of carotinoids. Thus, this intermediate may be reduced by means of lithium aluminium hydride and then oxidized with manganese dioxide to form 3-methyl-5-(1-hydroxy-2,6,6-trimethylcyclohexyl) - 2 - pentene-4-yne-1-al. This $C_{15}$-aldehyde may then be converted into vitamin A in a manner analogous to the conversion of $\beta$-ionylidene-acetaldehyde into vitamin A, an additional dehydration having to take place at any stage of the synthesis.

*Example*

A Grignard solution is prepared from 22 g. of magnesium, 166 g. of methyl iodide and 200 cc. of ether. To this solution are added in the course of 30 minutes, while stirring and cooling, 39.6 g. of 1-hydroxy-3-methyl-2-pentene-4-yne in 100 cc. of ether, whereupon the mixture is refluxed for 2½ hours. To the cooled solution are added dropwise in the course of ½ hour, while cooling with ice, 55 g. of 2,6,6-trimethylcyclohexanone in 100 cc. of absolute ether and the mixture is then heated in an oil bath of 60° C. for 3½ hours. The solution is then poured in a mixture of 80 g. of ammoniumchloride and 500 g. of ice, 200 cc. of ether are added and the whole is shaken with 5% sulphuric acid, till a clear separation of the layers is observed. The mixture is washed with water, dried with sodium sulphate and the ether is distilled off. In order to remove non reacted starting materials, the residue is distilled in vacuo (1–2 mm.) at a bath temperature of 80–85° C., until the distillation comes to an end. 45.5 g. of a crude condensation product remain in the flask. Yield: 47% of the theory.

For purification purposes said crude product is dissolved in 500 cc. of petroleum ether (50–70° C.) and extracted four times with 500 cc. each of 75% methanol. The combined methanol extracts are washed with petroleum ether. 3 liters of water are added. The mixture is extracted twice with 750 cc. each of petroleum ether (50–70° C.). The petroleum ether solution is washed with water, dried with sodium sulphate and the petroleum ether is distilled off. There are obtained 32 g. of viscous yellow oil. After several hours' standing, the oil begins to crystalllize and, after additional 3 hours, forms a crystal mash. Zerewitinoff test: 1.9 active hydrogen atoms per molecule.

I claim:

1-hydroxy-3-methyl-5-(1-hydroxy-2,6,6-trimethylcyclohexyl)-2-pentene-4-yne.

References Cited in the file of this patent

UNITED STATES PATENTS

| | | |
|---|---|---|
| 2,579,658 | Evans | Dec. 25, 1951 |
| 2,622,103 | Evans | Dec. 16, 1952 |
| 2,655,548 | Evans et al. | Oct. 13, 1953 |

OTHER REFERENCES

Tome: "Synthesis and Allylic Rearrangement of 1-(2'-Methylcyclohexen-1'-yl) - 3 - Methylpent-4-en-1-yn-3-ol." Page 8 (1 p.), Bachelor's Thesis at Mass. Inst. Tech. (1947).

Isler: Helv. Chim. Acta, vol. XXX (1947), pp. 1915–16 (2 pp.).

Milas et al.: 70 Jour. Amer. Chem. Soc., page 1830 (1 p., 1948).